US006696980B1

(12) United States Patent
Langner et al.

(10) Patent No.: US 6,696,980 B1
(45) Date of Patent: Feb. 24, 2004

(54) COCKPIT INSTRUMENT PANEL SYSTEMS AND METHODS OF PRESENTING COCKPIT INSTRUMENT DATA

(75) Inventors: Dale Langner, Olathe, KS (US); Philip I. Straub, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 18 days.

(21) Appl. No.: 10/086,951

(22) Filed: Feb. 28, 2002

(51) Int. Cl.[7] .......................... G01C 21/00; G01C 23/00
(52) U.S. Cl. .............................. 340/971; 701/3; 701/14
(58) Field of Search .............................. 340/971, 972, 340/973, 974; 701/3, 14; 342/26

(56) References Cited

U.S. PATENT DOCUMENTS

| | | | | |
|---|---|---|---|---|
| 3,967,098 A | * | 6/1976 | Harnagel et al. | 701/200 |
| 4,532,513 A | * | 7/1985 | Halvorson | 340/971 |
| 4,651,282 A | | 3/1987 | Robinson et al. | 364/443 |
| 5,089,816 A | * | 2/1992 | Holmes, Jr. | 340/995 |
| 5,475,594 A | * | 12/1995 | Oder et al. | 701/14 |
| 5,739,769 A | * | 4/1998 | Vladimir et al. | 340/945 |
| 6,057,786 A | | 5/2000 | Briffe et al. | 340/975 |
| 6,085,129 A | * | 7/2000 | Schardt et al. | 701/14 |
| 6,112,141 A | | 8/2000 | Briffe et al. | 701/14 |
| 6,279,017 B1 | | 8/2001 | Walker | 707/529 |
| 6,314,343 B1 | | 11/2001 | Adams et al. | 701/3 |
| 6,381,519 B1 | | 4/2002 | Snyder | 701/3 |
| 6,405,107 B1 | * | 6/2002 | Derman | 701/3 |

OTHER PUBLICATIONS

"Pilot's Guide—RMS 555 Bendix/King Radio Management System", *AlliedSignal Aerospace*, Copyright 1993, Allied-Signal, Inc., Olathe, KS (Mar. 1, 1993); 52 pages.

* cited by examiner

*Primary Examiner*—John Tweel
(74) *Attorney, Agent, or Firm*—Devon A. Rolf (57) ABSTRACT

Systems and methods are provided for integrating cockpit controls and data associated with the controls into a single interface having a bezel surrounding a single display. Furthermore in one embodiment, a system includes two bezels having individual and duplicate controls affixed thereon, where each bezel surrounds a display operable to present data related to the controls. Moreover, the bezels are proximate to one another. Additionally in one embodiment, a system, having an audio control panel interposed between two bezels, is provided.

26 Claims, 6 Drawing Sheets

COCKPIT INSTRUMENT PANEL SYSTEMS AND METHODS OF PRESENTING COCKPIT INSTRUMENT DATA

CROSS-REFERENCE TO RELATED APPLICATIONS

This application is related to the following co-pending, commonly assigned U.S. patent applications: "Cockpit Control Systems and Methods of Controlling Data on Multiple Cockpit Instrument Panels," Ser. No. 10/086,929; "Cockpit Instrument Panel Systems and Methods with Redundant Critical Flight Data Display," Ser. No. 10/086,783; "Cockpit Display Systems and Methods of Presenting Data on Cockpit Displays," Ser. No. 10/086,598; "Cockpit Instrument Panel Systems and Methods with Variable Perspective Flight Display," Ser. No. 10/086,573; "Customizable Cockpit Display Systems and Methods of Customizing the Presentation of Cockpit Data," Ser. No. 10/086,996, each of which is by the same inventors and of which the disclosure is herein incorporated by reference in its entirety.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the screen layouts, and data as described below and in the drawings hereto: Copyright© 2002, Garmin Corporation., All Rights Reserved.

FIELD OF THE INVENTION

The present invention relates generally to cockpit instrument panel systems and methods of presenting cockpit instrument data. In particular, the present invention is directed to integrating cockpit controls and cockpit control data.

BACKGROUND OF THE INVENTION

Modem commercial/private aircraft, as well as older aircraft, include a myriad of instrumentation panels having controls and displays used to present information related to the controls. The controls and the displays are operated, viewed, and interpreted by a pilot during flight of an aircraft. Some of these controls are used for assisting the pilot with navigation, such as a horizontal situation indicator, an attitude indicator, and the like. Other controls are used to permit radio communication with other pilots in the air or with air traffic controllers during flight. Still more controls, in recent years, are used to assist in navigation using Global Positioning Satellite (GPS) systems associated with satellite technology. Furthermore, transponder controls permit the aircraft to be uniquely identified and the aircraft's altitude communicated to air traffic controllers during flight.

For a neophyte, the quantity of controls and display panels contained within the cockpit of an aircraft is daunting. Even experienced pilots must stay focused in order to access various controls within the cockpit and interpret information presented on various displays throughout the cockpit. As a result, pilots must continually scan a plurality of available displays for flight information at any particular moment in time during flight.

In recent years, flight management systems (FMS) have emerged, wherein some controls within the cockpit have been centralized into a single location within the cockpit, usually located next to the seat of the pilot. With a FMS, the pilot can tune various controls associated with displays located throughout the cockpit. Yet, the pilot is still forced to access controls which are physically separated from the displays and multiple displays still exist within the cockpit. Additionally, the pilot often cannot visualize both the controls and the displays at the same time.

Multifunction displays (MFDs) have been developed wherein a single display screen presents control data associated with a select few controls within the cockpit. However, the controls are not integrated into the bezel which surrounds the MFDs, nor are the controls in close proximity to the MFDs. Moreover, the MFDs are limited to presenting data related to only a few select controls within the cockpit. Correspondingly, the pilot still must manage a myriad of displays and controls located at various locations throughout the cockpit.

As is apparent to those skilled in the art, a pilot and copilot must remain alert and focused on controls and displays at critical points during the flight, such as takeoffs, landings, inclement weather, emergencies, or equipment malfunctions. Thus, pilots are required to have many hours of training to master the controls and displays within the cockpit before receiving the proper certification to fly an aircraft. This is especially true with larger commercial aircrafts. Moreover as a result of the heightened mental acuity required during flight, many federal regulations also restrict the amount of time a pilot is permitted to fly in any given day in order to ensure the pilot remains alert during flight.

Therefore, there exists a need for a better integrated instrument panel system within the cockpit, which permits the pilot to more rapidly acquire vital information and to manage the controls related to that information from central locations. Moreover, there exists a need for better presentation of cockpit data to a pilot during flight.

SUMMARY OF THE INVENTION

The above mentioned problems related to existing instrument panel systems and existing presentations of cockpit data are addressed by the present invention and will be understood by reading and studying the following specification. Systems and methods are provided for cockpit instrument panels and cockpit data presentation which are more efficient and accurate than current cockpit instrument panels and cockpit data presentations. The systems and methods of the present invention offer improved cockpit instrument panels which provide a more efficient access to the controls within a cockpit to the pilot. Furthermore, the present invention offers a more integrated and usable presentation of control data related to the controls to a pilot within the cockpit during flight.

In one embodiment of the present invention, a cockpit instrument panel, is provided having a display, a bezel enclosing the display and having affixed thereon a navigational input control, a communication input control, and a transponder input control. Moreover, the display simultaneously presents navigational data, communication data, and transponder data associated with the controls.

In still another embodiment of the present invention, a cockpit instrument panel system is provided including a first bezel having one or more controls affixed to the first bezel. The first bezel surrounds a first display and the first display presents control data associated with the controls. Further, the system includes a second bezel having one or more additional controls affixed to the second bezel. The second bezel surrounds a second display, and the second display presents control data associated with the additional controls. Also, the system has an audio control panel having one or more audio controls situated between the first and second bezels and operable to provide audio capabilities.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

In the present invention, improved multifunction displays (MFDs) are provided. As used herein, a MFD is used broadly to include graphical user interface based (GUI-based) displays with integrated presentation data presented thereon using a variety of views. The views are configured on the MFDs to provide ready access to flight information data. In some embodiments of the present invention the use of the term MFD is employed in connection with or to refer to a primary flight display (PFD). In some embodiments of the present invention the use of the term MFD is employed in connection with or to refer to a navigation display (NAV display). Additionally, in some embodiments, multiple MFDs are included such that a first MFD is principally used as a PFD and a second MFD is principally used as a NAV display. In such embodiments, the second MFD or NAV display is in compliment to the PFD. In the present invention, multiple MFDs can be stacked one upon the other, or alternatively arranged side by side. Further, in some embodiments an MFD is adapted to include audio capabilities. As one of ordinary skill in the art will appreciate upon reading this disclosure, the flight information data which is presented on such MFDs can differ based on the aircraft type, e.g. frame and engine type.

In the invention, a "bezel" is provided as part of the MFDs. Typically, the bezel is the framed perimeter that surrounds a display, but is not part of the display itself. Further as used in this application, control data and instrumentation data, including flight information data, refer to data received by controls coupled to input devices, such as communication and navigational input devices, and data received from various equipment and sensors, such as the aircraft engine, fuel, airspeed, altitude and attitude sensors. For example, navigational and communication controls tune navigational devices (e.g., VLOC receivers, radios, and the like) within the aircraft and permit software operating on a processing device to receive and process the communication and navigational data collected by such devices. Equipment and sensor instrumentation facilitate the presentation of data relating to such parameters as aircraft engine, fuel, airspeed, altitude and attitude status.

In the present invention, this data can be operated on by software to generate one or more dynamic images on the GUI of a MFD display. As one of ordinary skill in the art will understand upon reading this disclosure, the display is capable of presenting text or graphical information. In some embodiments, the display provides image or video data. In one example, the GUI depicts a present movement, path and/or projected destination of an aircraft relative to locations on the ground along with airspeed, altitude, attitude and engine status data. As one skilled in the art will appreciate, input devices such as communication and navigation controls include settings such as a current radio frequency, channel, and the like.

Although specific cockpit controls and particular flight information data are described herein, these descriptions are presented by way of example only and are not intended to limit the scope of the present invention. As one of ordinary skill in the art will understand upon reading this disclosure, any existing or customized controls and flight information data are readily integrated with one or more multifunction displays (MFDs) according to the teachings of the present invention. And, any combination and arrangement of the MFDs and the flight information data presented thereon are intended to fall within the scope of the present invention. According to the teachings of the present invention, flight information data is available at all times. As one of ordinary skill in the art will understand upon reading this disclosure, the MFDs are positioned within the cockpit so that a pilot can view and access communication and navigation controls proximately located to the MFDs at all times during flight.

Figure 1:
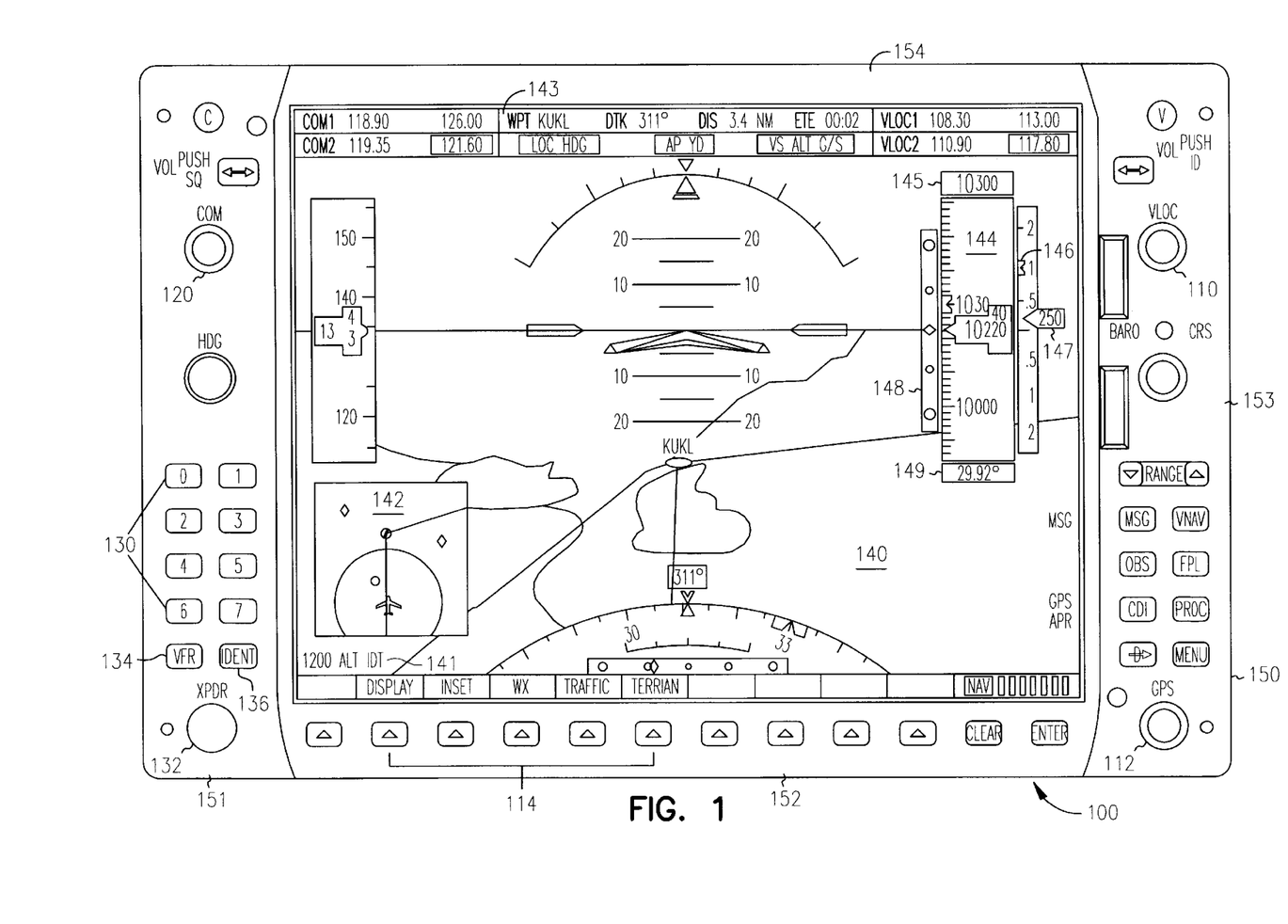
FIG. 1 is cockpit instrument panel according to the teachings of the present invention.

FIG. 1 illustrates an example of one cockpit instrument panel 100 according to the teachings of the present invention. It is readily appreciated that the data and labels presented within panel 100 are presented by way of illustration only. The panel includes a bezel 150 having four sides namely, a left side 151, a bottom side 152, a right side 153, and a top side 154. Further the panel 100 includes a display 140 enclosed by the four sides (e.g., 151, 152, 153, and 154) of the bezel 150. However, the invention is not so limited, and in some embodiments bezel 150 can be oriented on three or fewer sides of the display 140. As one skilled in the art will understand upon reading the disclosure, the scope of the present invention includes a bezel 150 proximately located to the display 140 on panel 100. The display 140, in more embodiments, is a PFD and is any GUI-enabled device capable of presenting text, image, graphical, or video data. Further, the PFD in some embodiments is adapted to include audio capabilities. These audio capabilities can include voice communication settings, audio quality settings, audio volume settings, and the like. Moreover, the bezel 150 has affixed thereon a number of navigational input controls, such as VLOC 110 which is a control for VHF Omnidirectional radio range often referred to as VOR.

Further, the bezel 150 has affixed thereon communication input controls, such as COM 120 permitting radio communications with air traffic controllers and/or other pilots in the air. Also, the bezel 150 has affixed thereon transponder input controls, such as numeric touch pad 130, XPDR control 132, IDENT control 136, and VFR control 134. In this way, the pilot can use the numeric touch pad 130 to enter a unique identifying number required by the air traffic controllers to identify the pilot's aircraft. In FIG. 1, the text string "1200 ALT IDT" 141 presented on the display 140 includes the aircraft's transponder identity information. The IDENT 136 control permits the aircraft to uniquely be identified on an air traffic controller's display when requested. For example, if the pilot presses the IDENT 136 control during flight, then the air traffic controller identifies the pilot's aircraft as a uniquely distinguishable and identifiable item on the controller's display. Further, the XPDR 132 control selects the mode of operation for transponder communications.

In some embodiments, the panel 100 includes a GPS control 112 for satellite navigation capabilities. In other embodiments, the panel includes autopilot controls (not depicted). Further, in some embodiments text messaging controls or video telecommunication controls are affixed on the bezel. In this way, a numeric touch pad 130 includes alpha characters and/or symbol characters on each touch pad (not depicted) along with a numeric depicted in FIG. 1. As one skilled in the art will appreciate, this permits a pilot to send and receive text messages from other pilots, the Internet, authorities, air traffic controllers, or other electronically interfaced sources if an appropriate wireless network connection is established. Further video controls, in some embodiments, permit the pilot to view the cabin of the aircraft for disturbances or for the air traffic controllers to view different locations within the cockpit and/or cabin of the aircraft.

However, as one of ordinary skill in the art appreciates, text messaging, video capabilities, or any other controller pilot data link communications (CPDLC) may be restricted by the Federal Aviation Administration (FAA), or prove otherwise undesirable to a particular airline or pilot, since this additional information can, in some embodiments, create unwanted and undesirable distractions for the pilot and copilot during flight. Therefore, these features are not required and can optionally be deployed with the tenets of the present invention.

Additional controls affixed to the bezel 150, in some embodiments, permit increased integration within the cockpit and provide customized presentations of data on display 140 of panel 100. For example, overlay controls 114 located on the bottom side 152 of the bezel 150, permit the pilot to adjust the main display 140 by overlaying graphical data related to weather (e.g., labeled as WX in FIG. 1), traffic, and terrain. Further, in some embodiments, the pilot customizes the display 140 by creating one or more insets within the display 140 such as inset display 142.

Display 140, in some embodiments, include a top portion 143 having control settings and readings depicted horizontally across the vertical top portion of the display 140. For example, communication channel 1 represented as COM1 is set to frequency 118.90 in FIG. 1. Communication input control settings include, in some embodiments, frequency data, channel data, and the like. Moreover, the display 140 can include one or more inset displays, such as display inset 144 depicting an example of the aircraft's vertical assent and vertical velocity. Display marker 145 presents preselected altitude data indicating how high the pilot wants the plane to climb. Marker 146 includes a preselect tag indicating the desired vertical speed, and tag 147 indicates the current vertical speed of the aircraft during the assent. Marker 148 shows the glide scope or VNAV deviation Finally, marker 149 indicates the altimeter setting.

As previously presented, the navigational input controls assist in collecting navigational input data which are processed and presented on the display 140. For example, and as one skilled in the art will readily appreciate, the main image depicted within display 140 shows an attitude director indicator presentation.

In some embodiments, the display 140 is operable to present aircraft equipment data, such as fuel flow, engine temperature, oil temperature, oil pressure, fuel quantity, RPMS, electrical load, outside air temperature, outside air pressure, and the like. Also, in some embodiments the panel 100 includes a bezel 150 having audio controls affixed thereon. In this way, nearly all controls which the pilot needs to access during flight are proximate to the display 140 which the pilot views. The display 140 is a PFD or MFD, which simultaneously presents various inset views and settings associated with the controls in a single display 140.

As is readily appreciated by those skilled in the art, the exact locations of the controls within the bezel 150 of panel 100 and FIG. 1 present a panel 100 having controls, with one example configuration, affixed to the bezel 150 for purposes of illustration only. Thus, any additional configurations are intended to fall within the broad scope of the present invention. Furthermore, in some embodiments, the bezel 150 includes less than four sides (e.g., 151, 152, 153, and 154).

Figure 2A:
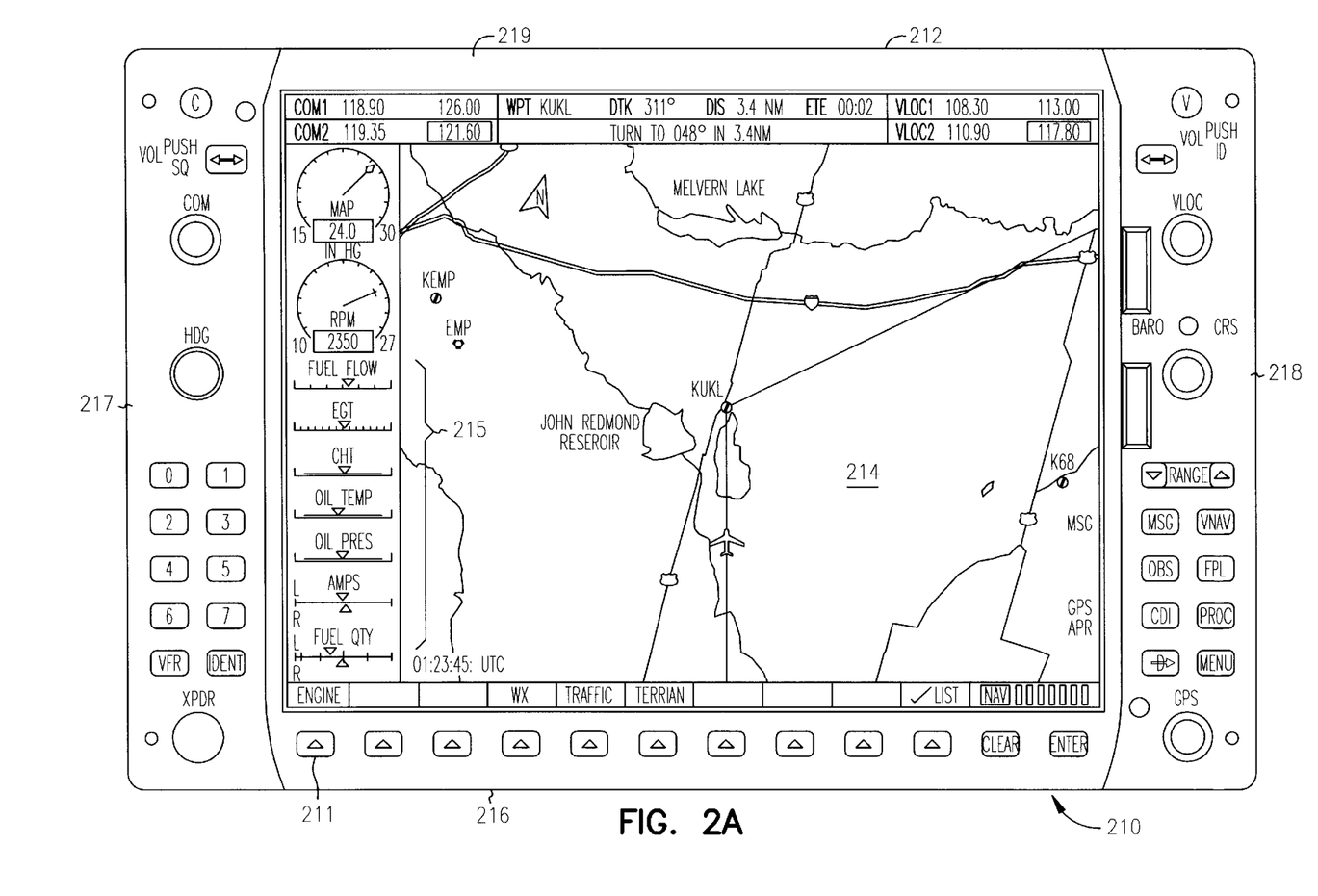
FIG. 2A is another cockpit instrument panel system according to the teachings of the present invention.
Figure 2B:
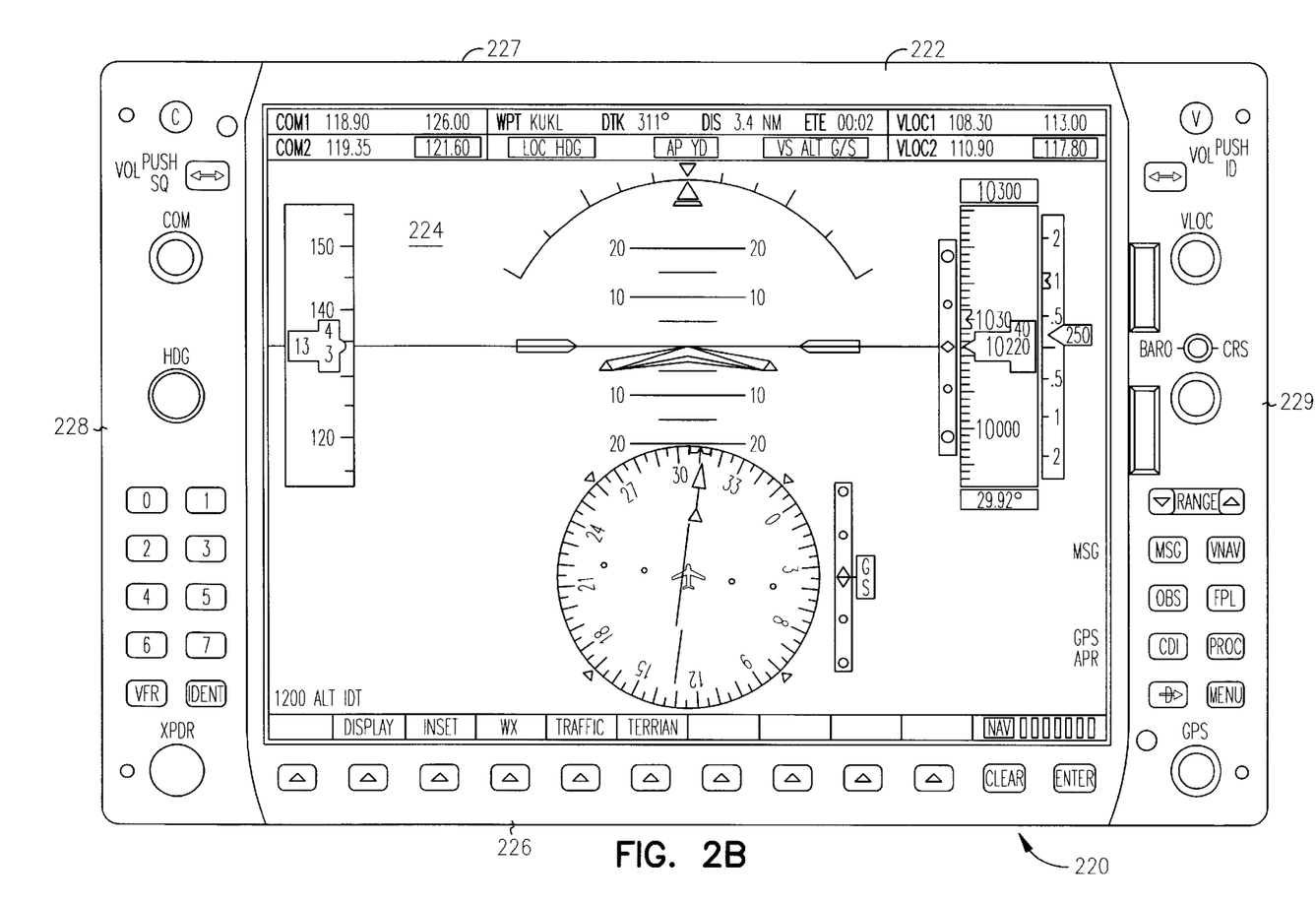
FIG. 2B is a still another cockpit instrument panel system according to the teachings of the present invention.

FIGS. 2A and 2B illustrate one cockpit instrument panel system according to the teachings of the present invention. The system includes a first instrument panel 210 having a first display 214 enclosed within a first bezel 212. Navigational controls, communication controls, and transponder controls are affixed on the first bezel 212. The first display 214 is operable to present navigational data, communication data, and transponder data associated with the controls of the first bezel 212. Moreover in some embodiments, the display 214 is operable to present aircraft equipment data 215, such as fuel flow, engine temperature, oil temperature, oil pressure, fuel quantity, electrical load, outside air temperature, outside air pressure, and the like. Equipment data 215 is optionally presented within display 214 by activating an equipment display control 211.

The system also includes in FIG. 2B a second instrument panel 220 having a second display 224 enclosed within a second bezel 222 and includes, in some embodiments, duplicate navigational controls and communication controls. The second display 224 is operable to present the navigational data and the communication data associated with the controls of the second bezel 222.

In some embodiments, audio controls are affixed to either the first bezel 212, the second bezel 222, or both bezels (e.g., 212 and 222). Further, in some embodiments either bezel (e.g., 212 or 212) or both bezels (e.g., 212 and 222) include GPS controls, autopilot controls, messaging controls (if desired), video controls (if desired), or others.

Additionally, in some embodiments a first edge (e.g., 216, 217, 218, or 219) of the first bezel 212 is parallel and proximate to a first edge (e.g., 226, 227, 228, or 229) of the second bezel 222. For example, bezel 212 includes a bottom edge 216 which is parallel to a top edge 227 of bezel 222, edge 216 is also proximately located next to edge 227. In this way, the pilot is capable of readily viewing both display 214 and display 224, further in some embodiments the controls affixed on one bezel (e.g., 212 or 222) alter the data being presented on both displays (e.g., 214 and 224). This provides a backup display and control system if one panel (e.g., 210 or 220) fails.

In some embodiments, the pilot customizes each display (214 and 224) with some presentation of data, resulting in views of the data being independently and simultaneously graphically presented on each of the displays (e.g., 214 and 224), such that a first view on the first display 214 is different from a second view on the second display 224.

Further as is readily apparent to those skilled in the art, the navigational controls are associated with navigational devices within the aircraft, the communication controls are associated with communication devices within the aircraft, the transponder controls are associated with a transponder device within the aircraft, and equipment controls (e.g., 211) are associated with equipment devices within the aircraft. As will be readily appreciated by those skilled in the art, each device within the aircraft is easily interfaced to the controls and affixed in duplicate to both bezels (e.g., 212 and 222), which are adjacent to both displays (e.g., 214 and 224).

Moreover in some embodiments, the devices are proximately located behind the bezels (e.g., 212 and/or 222) and/or behind the displays (e.g., 214 and 224). In this way, the dual displays, panels, controls, and devices are all integrated proximate to each other, thereby reducing the physical space required to accommodate these items and further providing for increased ease of use for the operator (e.g., pilot or copilot), while simultaneously providing an improved ergonomic experience for the operator.

Figure 3:
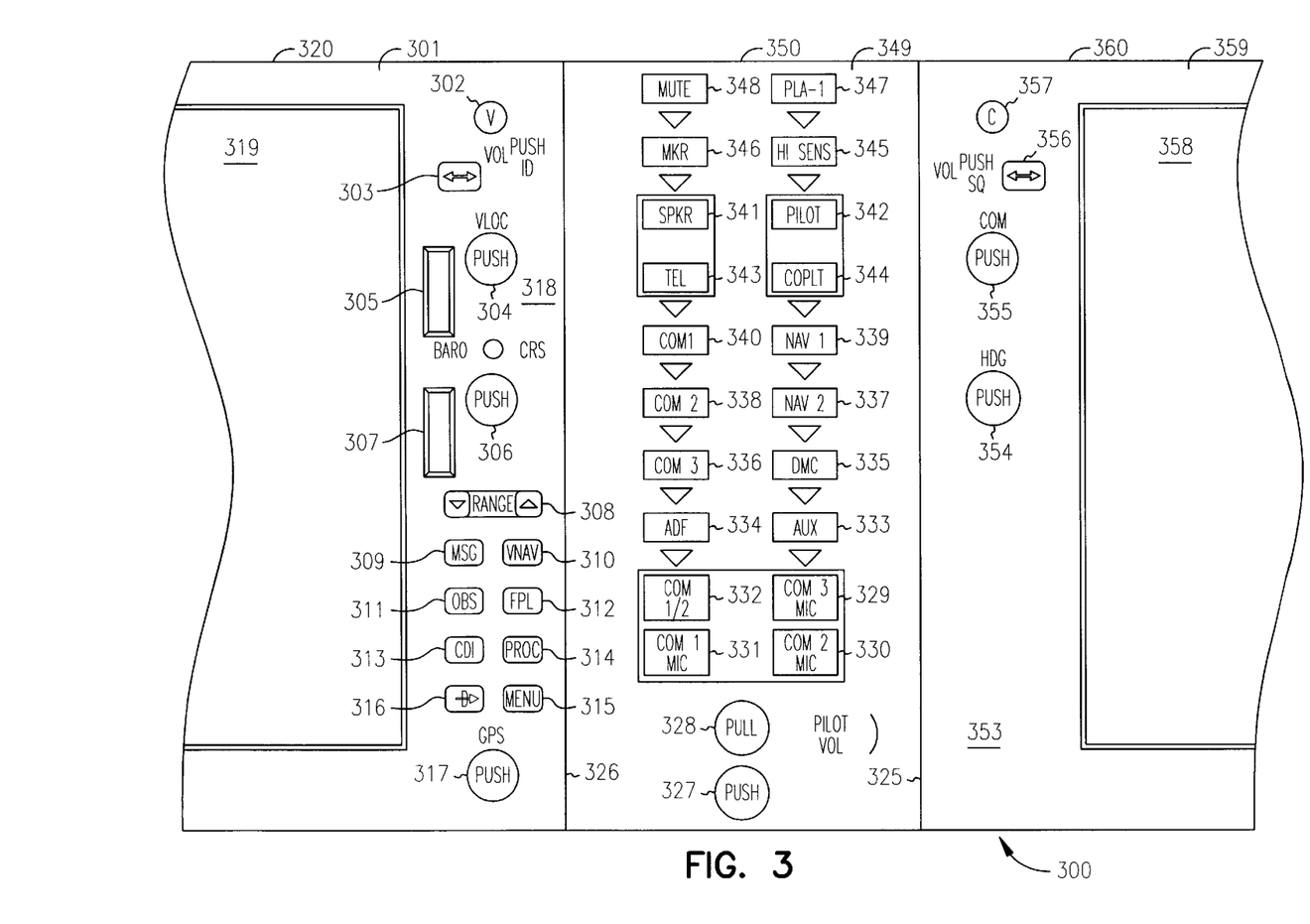
FIG. 3 is yet another cockpit instrument panel system according to the teachings of the present invention.

FIG. 3 illustrates another cockpit instrument panel system 300 according to the teachings of the present invention. The system 300 includes a first instrument panel 320 having a first bezel 301 with one or more controls (e.g., 302–317) affixed to the first bezel 301. The first bezel 301 also surrounds a first display 319 which is operable to present control data associated with the controls (e.g., 302–317). Further, the system 300 includes a second panel 360 having a second bezel 359 with one or more additional controls (e.g., 354–357) affixed on the second bezel 359. Moreover, the second bezel 359 surrounds a second display 358 which is operable to present control data associated with the additional controls (e.g., 354–357).

Further, system 300 includes an audio control panel 350 having an audio bezel 349 with one or more audio controls (e.g., 327–348) affixed on the audio bezel 349. The audio controls (e.g., 327–348) are operable to provide audio capabilities to the pilot. In some embodiments, a first side of 318 of the first bezel 301 is parallel and proximate to a first side 326 of the audio bezel 349. Further, a second side 325 of the audio bezel 349 is parallel and proximate to a first side 353 of the second bezel 359. In this way in, some embodiments, three independent panels (e.g., 320, 350, and 360) are ergonomically arranged to permit an operator (e.g., pilot or copilot) to simultaneously access one or more controls (e.g., 302–317) of the first bezel 301, with a single hand, if desired, one or more controls (e.g., 327–348) of the audio bezel 349, and one or more controls (e.g., 354–357) of the second bezel 359.

As is readily apparent to those skilled in the art, this arrangement of system 300 permits optimal access to controls and displays in a centralized fashion within the cockpit. Correspondingly, a pilot can readily access and obtain information needed during flight without requiring any special or unusual physical dexterity.

In other embodiments, a separate color is used to represent different information presented on displays 319 and 358. In this way, customized insets within the displays (e.g., 319 or 358) are readily identified as pilot configured information, and critical information is readily distinguished. Moreover, in some embodiments, messaging controls (if desired) operable to permit messaging capabilities are located on one or more of the bezels (e.g., 301, 349, or 359). Therefore, if a wireless network connection is made within the cockpit, the messaging controls permit text message communications, and are readily accessible from one or more of the bezels (e.g., 301, 349, or 359).

In another embodiment, audio panel 350 includes controls to adjust audio quality and/or volume. For example, control 348 mutes any audio from being heard, while control 341 provides audio via a speaker device. As is readily apparent, audio panel 350, is operable to include a variety of audio-related controls and any configuration or addition of such audio controls are intended to fall within the broad scope of the present invention.

Moreover on other embodiments, controls occurring on the audio panel 350 are vertically oriented into two columns, wherein one column is designed as controls for the pilot and is proximate to the pilot's instrument panel and the remaining column is designed for the copilot and is proximate to the copilot's instrument panel. In this way, a single audio panel 350 can be used seamlessly by both the pilot and the copilot during flight, wherein access to the appropriate controls are readily acquired due to the vertical orientation and the proximity of the controls to the panels (e.g., ergonomic arrangement of FIG. 3).

Figure 4:
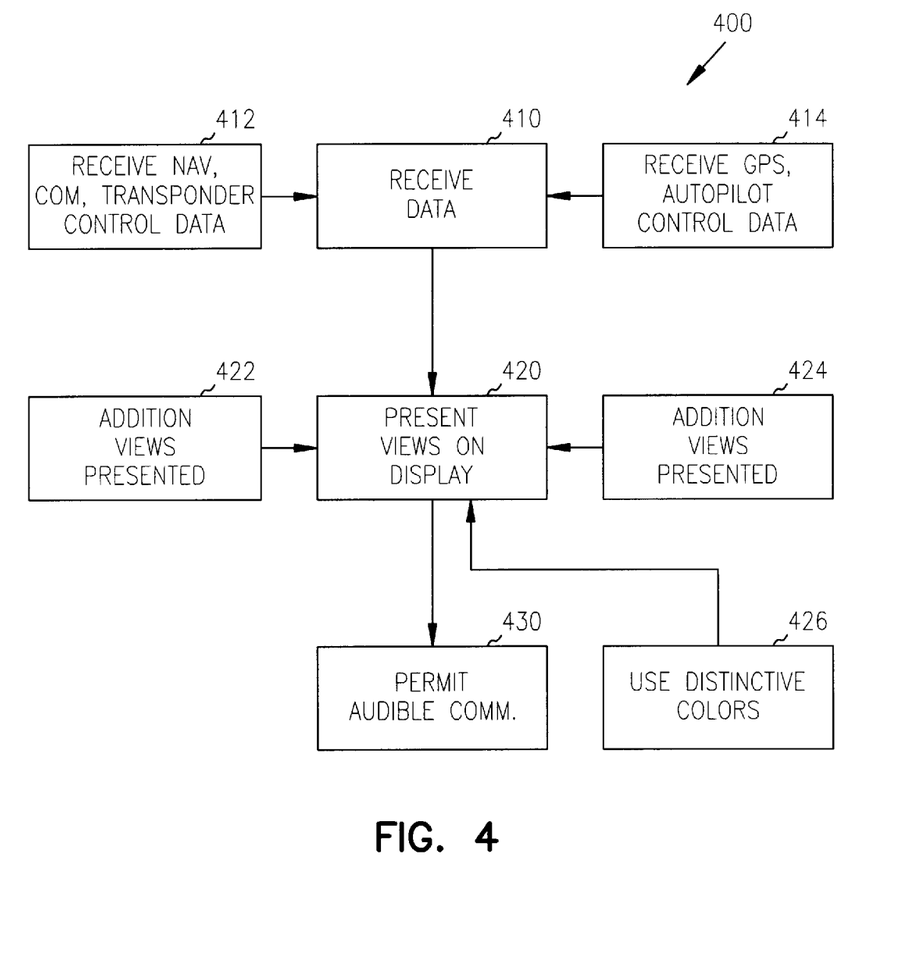
FIG. 4 is a flow diagram of a method to present cockpit instrument data according to the teaching of the present invention.

FIG. 4 illustrates one flow diagram of one method 400 to present cockpit instrument data according to the teaching of the present invention. Initially, data are received in block 410, the data is received by any processing device implemented method 400 depicted in FIG. 4. Moreover, the data is acquired from senors and controls interfaced to the processing device. In some embodiments, the received data represents communication data associated with communication controls, navigational data associated with navigational data, and transponder data associated with transponder controls, as depicted in block 412. In other embodiments, GPS data associated with GPS controls and autopilot data associated with autopilot controls are received, as depicted in block 414.

As one skilled in the art will appreciate, a single embodiment can include all the aforementioned data and controls, therefore the embodiments are not intended to be exclusive of one another. All controls are affixed to a bezel or otherwise proximately located to a single display. The proximity of the controls to the display provides improved ergonomic and ease of use capabilities to an operator utilizing method 400. Moreover, the integration and proximity of the controls to the display decrease physical space requirements within a cockpit of an aircraft.

In block 420, one or more views of the communication data, navigational data, and transponder data, are presented on the display after being translated and otherwise rendered by the processing device. Additional views, in some embodiments, are presented to depict on the display GPS data, as shown in block 422. In still other embodiments, additional views are presented to depict on the display autopilot data, as shown in block 424.

Further, in some embodiments, audible communications are permitted by using audio controls affixed to or otherwise proximately located to the bezel or the display as shown in block 430. In yet other embodiments, presentation of the views depicts each view using one or more distinctive colors for ready identification by the pilot or the copilot, as shown in block 426. Additional visual cues can be used to also provide ready identification, such as blinking data presented on the display and other visual effects data.

Figure 5:
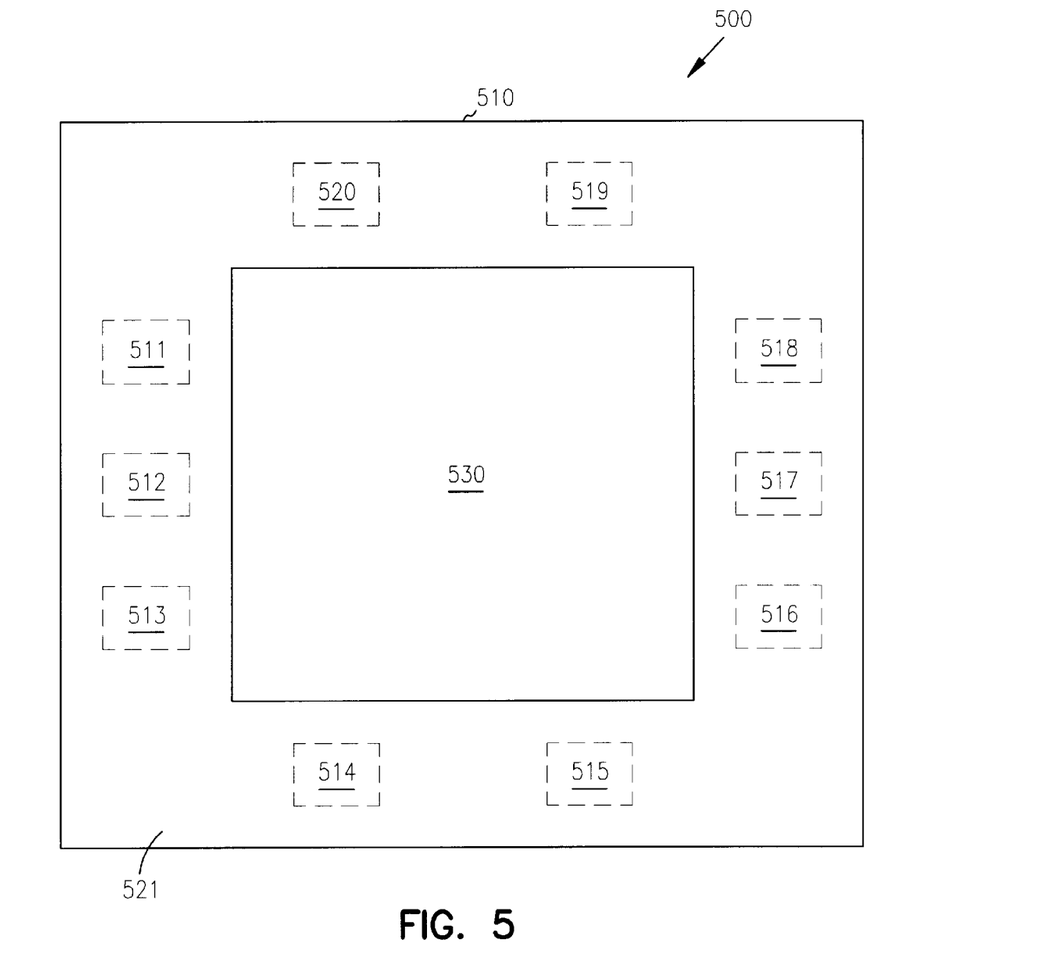
FIG. 5 is a block diagram of a cockpit instrument panel according to the teachings of the present invention.

FIG. 5 shows one block diagram of a cockpit instrument panel 500 according to the teachings of the present invention. The panel 500 includes a bezel 510 surrounding a display 530. Moreover, the rear surface of the bezel 510 includes electronic circuitry panels (e.g., 511–520). Each individual circuit is affixed to the rear side of the bezel 510, and is coupled to controls located on a front side of the bezel 510, thereby permitting the adjustment of the controls affixed to a front side of the bezel 510.

As one skilled in the art will appreciate, this permits the controls and the circuit panels (e.g., 511–520) to be integrated into both the front side of the bezel 510 and the rear side of the bezel 510, respectively. Furthermore, the display 530 is encompassed by the bezel 510 thereby, providing significant integration within the cockpit instrument panel 500 of FIG. 5. Also as one skilled in the art will appreciate in some embodiments, the circuit panels (e.g., 511–520) are coupled to the controls and proximately placed behind the bezel 510 and/or display 530, and therefore the circuit panels (e.g., 511–520) need not be physically affixed to the bezel 510.

As previously discussed, by configuring the circuit panels (e.g., 511–520) behind a rear surface of the bezel and/or behind a rear surface of the display 530 within panel 500 significant physical space can be reduced within an aircraft having panel 500. Physical space is at a premium with modern aircraft and the present invention provides improved space utilization, thereby freeing previously occupied physical space within the aircraft to be used for additional equipment, sensors, or devices as desired. Moreover, the proximity of the controls to the display 530 provide improved ergonomic and ease of use features to the operator of the panel 500.

As one of ordinary skill in the art will understand upon reading this disclosure, the methods of the present invention can be described in the context of computer-executable instructions, such as program modules, being executed by a computer. Generally, program modules include routines, programs, objects, components, data structures, etc. that perform particular tasks or implement particular abstract data types.

As one of ordinary skill in the art will understand upon reading and comprehending this disclosure, any one or more of the above features can be combined into a particular embodiment of the invention. Likewise, in the invention any one or a combination of the above functions can be optionally deactivated in the device. One of ordinary skill in the art will further understand that the method includes using a computer accessible medium having a set of computer executable instructions operable to perform the method. Other embodiments may be utilized and structural, logical, and electrical changes may be made without departing from the scope of the present invention.

In some embodiments, the methods provided above are implemented as a computer data signal embodied in a carrier wave or propagated signal that represents a sequence of instructions which, when executed by a processor, cause the processor to perform the respective method. In other embodiments, methods provided above are implemented as a set of instructions contained on a computer-accessible medium capable of directing a processor to perform the respective method. In varying embodiments, the medium includes a magnetic medium, an electronic medium, or an optical medium.

CONCLUSION

The above cockpit instrument panels, systems and methods have been described, by way of example and not by way of limitation, with respect to improving input controls and pilot delivered display data for an aircraft. That is, the instrument panels, systems, and methods provide for better integrated control, access, and presentation of information within the cockpit. The integration and placement of controls and displays of the present invention provide for improved flight safety by alleviating the physical dexterity and mental acuity required with existing cockpit instrument panels. Moreover, the integration and placement of controls and displays of the present invention reduce physical space requirements within a cockpit of an aircraft.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A cockpit instrument panel, comprising:
   a display;
   a bezel enclosing the display and having affixed thereon a navigational input control, a communication input control, and a transponder input control; and
   wherein the display is operable to simultaneously and graphically present navigational data, communication data, and transponder data associated with the controls.

2. The instrument panel of claim 1, further comprising a GPS control affixed to the bezel.

3. The instrument panel of claim 2, further comprising an autopilot control affixed to the bezel.

4. The instrument panel of claim 3, further comprising a messaging control affixed to the bezel.

5. The instrument panel of claim 1, wherein the navigational data includes an altimeter, a horizontal situation indicator, and an attitude indicator.

6. The instrument panel of claim 1, wherein the communication data includes frequency data and channel data.

7. The instrument panel of claim 1, wherein the display further simultaneously displays aircraft equipment data.

8. The instrument panel of claim 1, further comprising an audio control affixed to the bezel and operable to control audio communications.

9. A cockpit instrument panel system, comprising:
   a first display enclosed within a first bezel, wherein the first bezel includes navigational controls, communication controls, and transponder controls, and wherein the first display is operable to graphically present navigational data, communication data, and transponder data associated with the controls of the first bezel; and a second display enclosed within a second bezel, wherein the second bezel includes duplicate navigational controls, duplicate communication controls, and equipment controls, and wherein the second display is operable to graphically present the navigational data, the communication data, and equipment data associated with the controls of the second bezel.

10. The system of claim 9, further comprising audio controls affixed on at least one of the first bezel and the second bezel.

11. The system of claim 9, further comprising at least one of GPS controls, autopilot controls, and messaging controls affixed on at least one of the first bezel and the second bezel.

12. The system of claim 9, wherein a first edge of the first bezel is parallel and proximate to a first edge of the second bezel.

13. The system of claim 9, wherein the first display is operable to present a first graphical view of the navigational data while the second display is operable to simultaneously display a second graphical view of the navigational data, and the first view is different from the second view.

14. The system of claim 9, wherein the navigational controls are associated with one or more navigational devices, the communication controls are associated with one or more communication devices, the transponder controls are associated with a transponder device, and the equipment controls are associated with one or more equipment monitoring devices, and wherein the electronic circuitry responding to these controls is physically proximately located behind the bezels and the displays.

15. A cockpit instrument panel system, comprising:

a first bezel having one or more controls affixed to the first bezel, wherein the first bezel surrounds a first display, the first display operable to graphically present control data associated with the controls;

a second bezel having one or more additional controls affixed to the second bezel, wherein the second bezel surrounds a second display, the second display operable to graphically present control data associated with the additional controls; and an audio control panel having one or more audio controls situated between the first and second bezels and operable to provide audio capabilities.

16. The system of claim 15, further comprising a first side of the first bezel parallel and proximate to a first side of the audio panel, and a second side of the audio panel parallel and proximate to a first side of the second bezel.

17. The system of claim 16, wherein the first bezel, the audio control panel, and the second bezel are arranged to permit an operator to simultaneously access one or more of the controls on the first bezel, one or more of the controls on the audio control panel, and one or more of the additional controls on the second bezel.

18. The system of claim 15, wherein the first display and the second display are operable to present the data in one or more colors.

19. The system of claim 18, wherein separate colors are used to distinguish different logically-related portions of the data.

20. The system of claim 15, wherein at least one of the bezels include messaging controls operable to permit messaging capabilities on at least one of the displays.

21. A method to present cockpit instrument data, comprising:

receiving communication data associated with communication controls, navigational data associated with navigational controls, and transponder data associated with transponder controls, wherein the controls are located on a single bezel; and presenting one or more graphical views of the communication, the navigational data, and the transponder data on a display encompassed by the bezel.

22. The method of claim 21, further comprising:

receiving GPS data associated with GPS controls located on the bezel; and presenting one or more additional views of the GPS data on the display.

23. The method of claim 21, further comprising:

receiving autopilot data associated with autopilot controls located on the bezel; and presenting one or more additional views of the autopilot data on the display encompassed by the bezel.

24. The method of claim 21, further comprising:

controlling audible communications using one or more audio controls located on the bezel.

25. The method of claim 21, wherein presentation of the views presents each view using one or more distinctive colors on the display.

26. A method of providing an integrated cockpit panel, comprising:

providing a bezel encompassing a display operable to graphically present control data;

providing one or more controls located on a front side of the bezel, wherein one or more of the controls adjust the control data presented on the display; and providing one or more control devices proximately located on a rear side of the bezel or on a rear side of the display, each control device coupled to one of the controls, wherein the control devices are adjusted by the controls and provide the control data.

* * * * *